United States Patent Office 2,945,872
Patented July 19, 1960

2,945,872
PREPARATION OF METALLO ALKYL XANTHATE-TRIALKYL PHOSPHITE COMPLEXES

Gail H. Birum, Dayton, Ohio, assignor to Monsanto Chemical Company, St. Louis, Mo., a corporation of Delaware No Drawing. Filed May 26, 1954, Ser. No. 432,593

3 Claims. (Cl. 260—431)

The present invention provides certain heavy metal complexes containing organically combined phosphorus and sulfur, methods of preparing the same and biological toxicant compositions comprising said complexes, and methods of destroying pest organisms in which methods said toxicant compositions are employed.

According to the invention there are provided new and valuable metallo alkyl xanthate-trialkyl phosphite complexes by contacting a 2:1 trialkyl phosphite-metal halide complex with an alkali metal o-alkyl xanthate substantially according to the scheme:

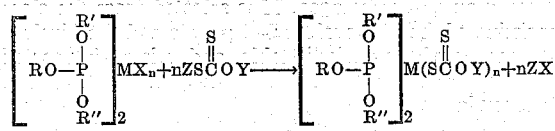

in which R, R', R" and Y are alkyl radicals of from 1 to 8 carbon atoms, Z is alkali metal, X is halogen and M is selected from the class consisting of the monovalent I–B metals and the divalent II–B metals of the periodic table and $n$ is an integer of from 1 to 2.

Trialkyl phosphite-metal halide complexes having the above formula and useful for the present purpose are, for example, the complexes of one mole of $Cu_I$, $Ag_I$, $Au_I$, $Hg_{II}$, $Zn_{II}$ or $Cd_{II}$ chloroide, bromide or iodide with two moles of a simple or mixed trialkyl phosphite such as trimethyl, triisopropyl, tri-n-propyl, tri-tert-butyl, tri-n-amyl, tri-n-hexyl, tri-n-heptyl, tris(2-ethylhexyl), tri-n-octyl, amyl diethyl, butyl di-n-propyl or ethyl methyl n-octyl phosphite. As illustrative of alkali metal O-alkyl xanthates which may be condensed with the trialkyl phosphite-metal halide complexes to give the present metallo alkyl xanthate-trialkyl phosphite complexes may be mentioned, e.g., potassium ethyl xanthate, sodium methyl xanthate, sodium butyl xanthate, lithium amyl xanthate, sodium isopropyl xanthate, potassium n-hexyl xanthate, potassium n-heptyl xanthate, lithium 2-ethylhexyl xanthate, sodium n-hexyl xanthate, etc.

The present complexes are readily obtainable by contacting the trialkyl phosphite-metal halide complex with the alkali metal alkyl xanthate at ordinary or increased temperatures until formation of the metallo compound has taken place. Inasmuch as the reaction involves condensation of one mole of the metal halide complex with 1 or 2 moles of the xanthate depending upon the valency of the metal, stoichiometric proportions of these reactants are advantageously employed; however, an excess of either the metal halide complex or of the xanthate may be used. In order to effect smooth reaction, it may be desirable to conduct the reaction in an inert diluent, which diluent may be ether, dioxane, benzene, toluene, hexane, kerosene, etc. The reaction temperature used depends upon the nature of the initial xanthate and complex employed, the presence or absence of catalyst, and reaction time. Generally, it is advisable to effect the reaction by mixing the components at room temperature and then heating the reaction mixture to a temperature of, say from 40° C. to the refluxing point of the reaction mixture. The progress of the reaction may usually be gauged by noting formation of by-product alkali metal halide in the reaction mixture. The metallo alkyl xanthate-trialkyl phosphite complexes are readily recovered from the final product by methods customarily employed in the art, e.g., by filtering off or washing out the alkali metal halide present and removing any unreacted material or diluent by distillation, extraction, etc.

The present complexes are stable, well-defined compositions which may be water-insoluble but which are soluble in the customary organic solvents. They are particularly useful for purposes requiring incorporation of a metallo compound into organic media, and hence are of utility as lubricant and diesel fuel additives, as rubber compounding chemicals, etc. They are valuable as biological toxicants and especially as the effective ingredients of bacteriostatic, fungicidal and insecticidal compositions. The present metallo alkyl xanthate-trialkyl phosphite complexes are of particular utility as agricultural fungicides and insecticides in that they do not injure plants when applied thereon for the purpose of killing insect pests on the foliage thereof or for preventing and eradicating fungus growth on the plants.

The invention is further illustrated, but not limited, by the following examples:

Example 1

A 2:1 triethyl phosphite-cuprous chloride complex was prepared as follows: 66.4 g. (0.4 mole) of triethyl phosphite was added during a period of 20 minutes to a mixture of 19.8 g. (0.2 mole) of cuprous chloride and 250 ml. of ether. During the addition the temperature of the reaction mixture rose from 24° C. to 34.9° C. and then began to decrease when all of the phosphite had been added. The reaction mixture was then refluxed for 4 hours, filtered to remove about 0.5 g. of solid, and the filtrate concentrated to a pot temperature of 54° C./0.2 mm. to give as residue 84.3 g. (98% theoretical yield) of the viscous 2:1 triethyl phosphite-cuprous chloride complex, $n_D^{25}$ 1.4786, and analyzing as follows:

|  | Found | Calcd. for $C_{12}H_{30}ClCuO_6P_2$ |
|---|---|---|
| Percent Cl | 8.53 | 8.24 |
| Percent P | 13.52 | 14.4 |

The 2:1 triethyl phosphite-cuprous chloride complex was condensed with potassium ethyl xanthate as follows: 43.1 g. (0.1 mole) of the complex was added during 15 minutes to a mixture of 24 g. (0.15 mole) of the xanthate and 150 ml. of benzene. During addition of the complex the temperature of the reaction mixture rose from 30° C. to 38° C. and the reaction mixture turned grey. After all of the complex had been added, the temperature of the reaction mixture was brought to reflux (80–82° C.), whereupon the color changed from grey to yellow. Refluxing was continued for 2 hours. The whole was allowed to stand overnight at room temperature, and then filtered to remove by-product potassium chloride and some unreacted xanthate. Concentration of the filtrate to a pot temperature of 53° C./0.1 mm., gave as residue 51.8 g. (theory 51.7 g.) of the viscous, yellow cuprous ethyl xanthate-triethyl phosphite complex, $[(C_2H_5O)_3P]_2CuSC(S)OC_2H_5$, $n_D^{25}$ 1.5749, and analyzing as follows:

|  | Found | Calcd. for $C_{15}H_{35}CuO_7P_2S_2$ |
|---|---|---|
| Percent Cu | 12.31 | 12.3 |
| Percent S | 12.33 | 12.4 |
| Percent P | 11.52 | 12.00 |

Example 2

This example shows testing of the cuprous ethyl xanthate-triethyl phosphite complex of the above example against the microorganisms *Micrococcus pyogenes aureus* and *Salmonella typhosa*. Using sterile melted nutrient agar, there were prepared respective culture media having a concentration of 1 part of the cuprous compound per thousand parts of agar and 1 part of the cuprous compound per 10 thousand parts of the agar. Petri dishes of the culture media were then spot inoculated, on opposite sides of the same dish, with the microorganisms and incubated for 5 days at a temperature of 25° C. At the end of that time inspection of the plates showed complete inhibition of growth of both organisms at both concentrations of the cuprous complex.

Example 3

The cuprous ethyl xanthate-triethyl phosphite complex of Example 1 was tested against fungus growth by inoculating slants of Sabouraud's Dextrose Agar containing a 0.1 percent concentration of the cuprous compound with *Aspergillus niger*, and incubating the inoculated plates at a temperature of 25° C. for 5 days. At the end of that time inspection of the slants showed complete inhibition of fungus growth.

Example 4

Bean plants infested with the 2-spotted mite were sprayed with an atomizer on both leaf surfaces with an emulsion of the cuprous ethyl xanthate-diethyl phosphite complex of Example 1. The emulsion was prepared by adding a cyclohexanone solution of the compound and an emulsifying agent to water to give emulsions containing concentrations of 0.2 percent and 0.1 percent of the compound respectively. The emulsion contained 0.2 percent by weight based on the weight of the total emulsion of an alkylene glycol-alkyl benzene sulfonate emulsifier. Plants which had been sprayed with the emulsions were then allowed to remain under standard conditions of sunlight and watering for a period of 1 week. At the end of that time observation of the sprayed plants showed a 100 percent kill of the mites. No injury to the plants was observed.

Example 5

A 2:1 triethyl phosphite-mercuric chloride complex was prepared substantially according to the procedure described in Example 1 for preparation of the corresponding cuprous chloride complex: 18.1 g. (0.03 mole) of 2:1 triethyl phosphite-mercuric chloride complex was added during 6 minutes to a mixture consisting of 200 ml. of benzene and 7.2 g. (0.045 mole) of potassium ethyl xanthate. The resulting reaction mixture was then warmed to 50° C. and 7.2 g. (0.045 mole) of additional potassium ethyl xanthate was added. The whole was then refluxed for 15 minutes. After being allowed to cool, the reaction mixture was filtered to remove potassium chloride and unreacted potassium ethyl xanthate. Concentration of the filtrate gave substantially pure mercuric ethyl xanthate-triethyl phosphite complex analyzing 25.46% mercury as against 25.8%, the calculated value for the complex.

When employed as bacteriostats the present metallo alkyl xanthate-trialkyl phosphite complexes may be incorporated into organic solvents, say, ethanol or isopropyl alcohols or into emulsions prepared by mixing such solutions of the compounds with water in the presence of an emulsifying agent. The present compounds may be mixed with soaps or synthetic detergents for use as germicidal cleansing compositions. As fungicides the present complexes are highly efficient for preventing and retarding fungus growth on textiles, fur, leather, wood, etc. They may be applied directly to the material which is to be treated, but because they are effective in extremely dilute concentrations it is preferred to incorporate the present agents with a carrier or diluent.

Fungicidal, bactericidal or insecticidal dusts may be prepared by mixing the metallo alkyl xanthate-trialkyl phosphite complexes with dusting materials such as talc, clay, bentonite, pumice, etc. Suspensions, dispersions, or emulsions of the compounds in water are advantageously employed in the treatment of plant foliage, textiles, leather, and other materials with which it is not desirable to employ either a solid carrier or an organic solvent.

What I claim is:

1. The method which comprises contacting a trialkyl phosphite-metal halide complex having the formula

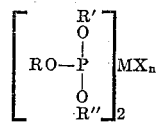

in which R, R' and R" are alkyl radicals of from 1 to 8 carbon atoms, X is halogen, M is selected from the class consisting of the monovalent I–B metals and the divalent II–B metals of the periodic table, and $n$ is an integer of from 1 to 2, with an alkali metal o-alkyl xanthate having the formula

in which Z is alkali metal and Y is an alkyl radical of from 1 to 8 carbon atoms and recovering from the resulting reaction product a metallo complex having the formula

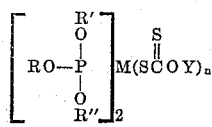

in which R, R', R", M, Y, and $n$ are as herein defined.

2. The method which comprises contacting a 2:1 triethyl phosphite-cuprous chloride complex with potassium ethyl xanthate and recovering a cuprous ethyl xanthate-triethyl phosphite complex from the resulting reaction product.

3. The method which comprises contacting a 2:1 triethyl phosphite-mercuric chloride complex with potassium ethyl xanthate and recovering a mercuric ethyl xanthate-triethyl phosphite complex from the resulting reaction product.

References Cited in the file of this patent

UNITED STATES PATENTS

| | | |
|---|---|---|
| 2,150,759 | Carter | Mar. 14, 1939 |
| 2,500,195 | McDermott | Mar. 14, 1950 |
| 2,582,204 | Kosolapoff | Jan. 8, 1952 |
| 2,631,962 | Moore | Mar. 17, 1953 |
| 2,645,613 | Adelson | July 14, 1953 |
| 2,651,648 | Meyer | Sept. 8, 1953 |
| 2,651,649 | Tuwiner | Sept. 8, 1953 |